Feb. 24, 1942. N. M. THOMAS 2,274,465
APPARATUS FOR MANUFACTURING CONFECTIONERY PRODUCTS
Filed July 10, 1941 3 Sheets-Sheet 1
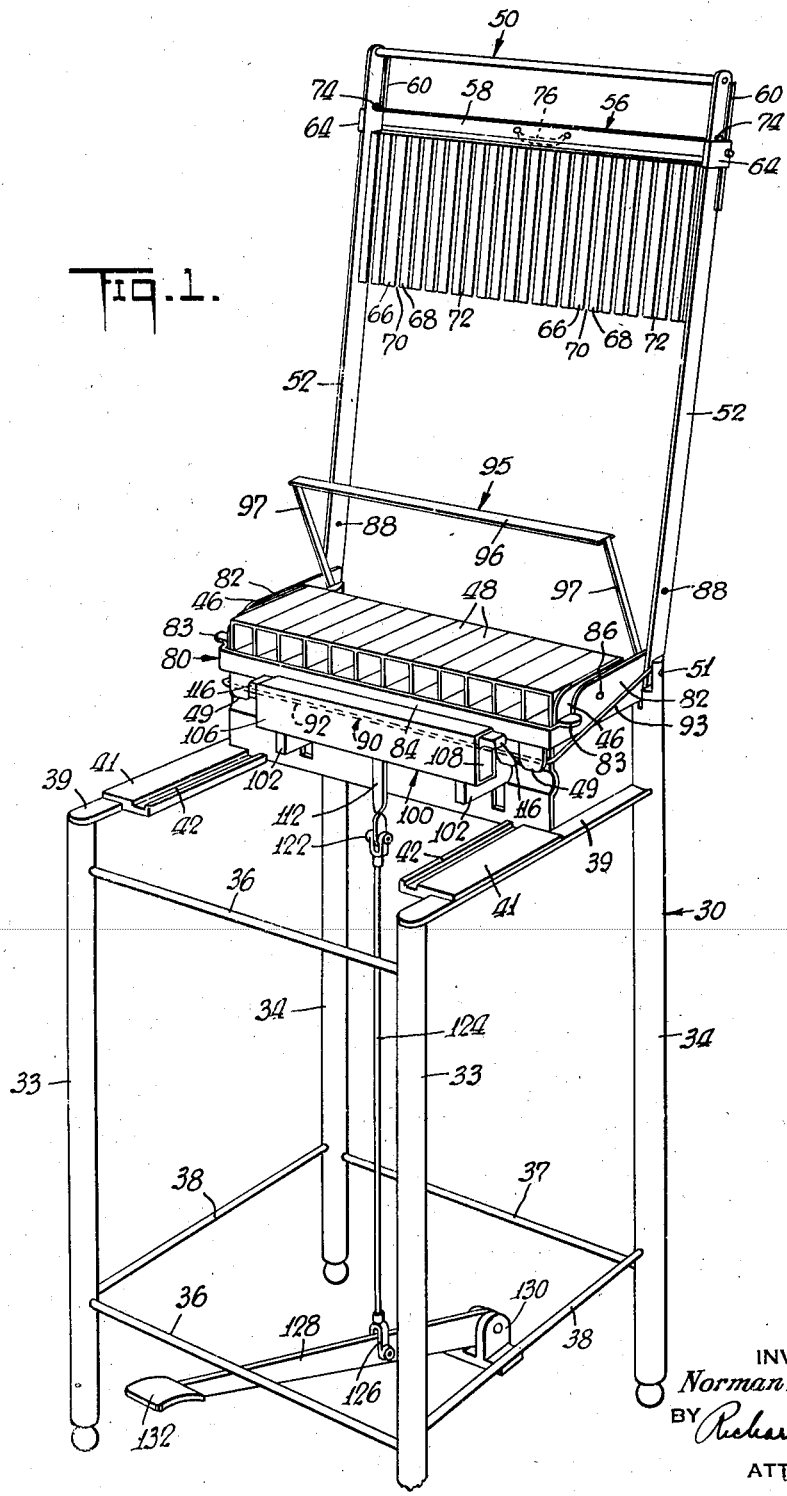
INVENTOR
Norman M. Thomas
BY Richard Newling
ATTORNEY Feb. 24, 1942.    N. M. THOMAS    2,274,465
APPARATUS FOR MANUFACTURING CONFECTIONERY PRODUCTS
Filed July 10, 1941    3 Sheets-Sheet 2
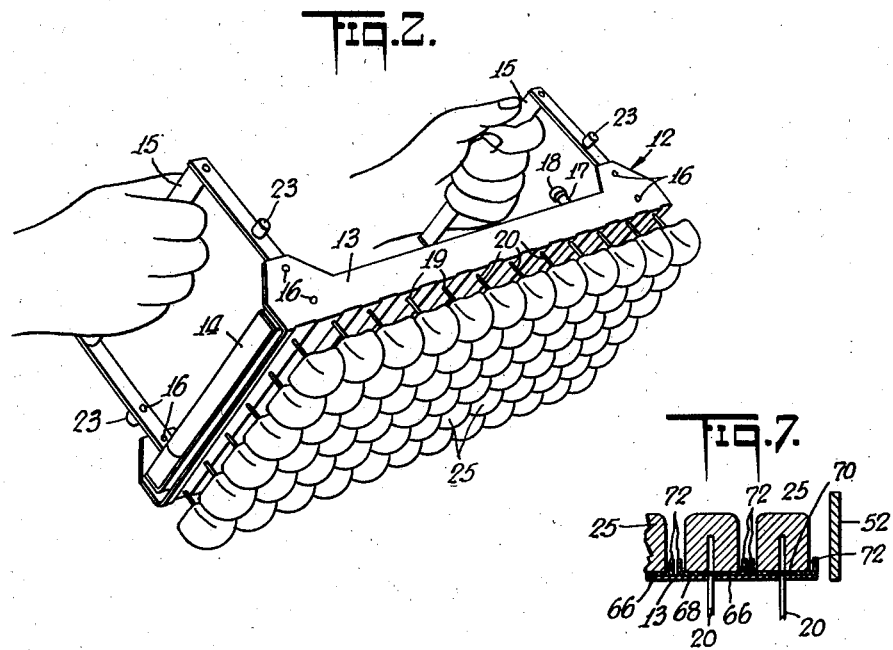
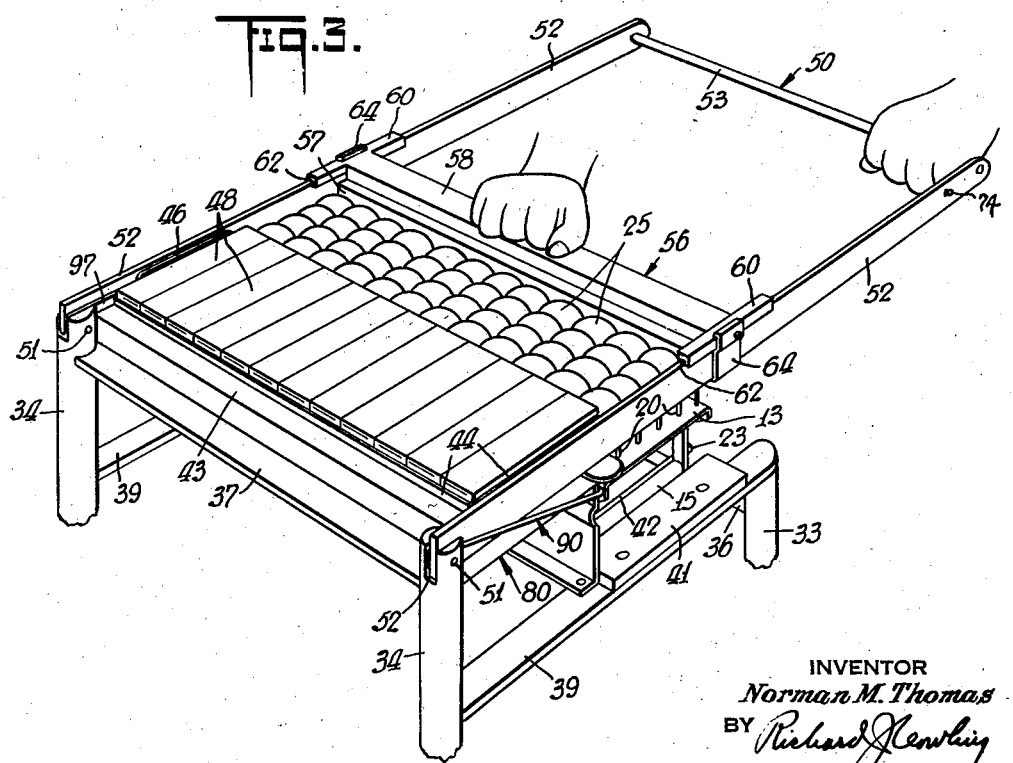
INVENTOR
Norman M. Thomas
BY Richard J. Newling
ATTORNEY

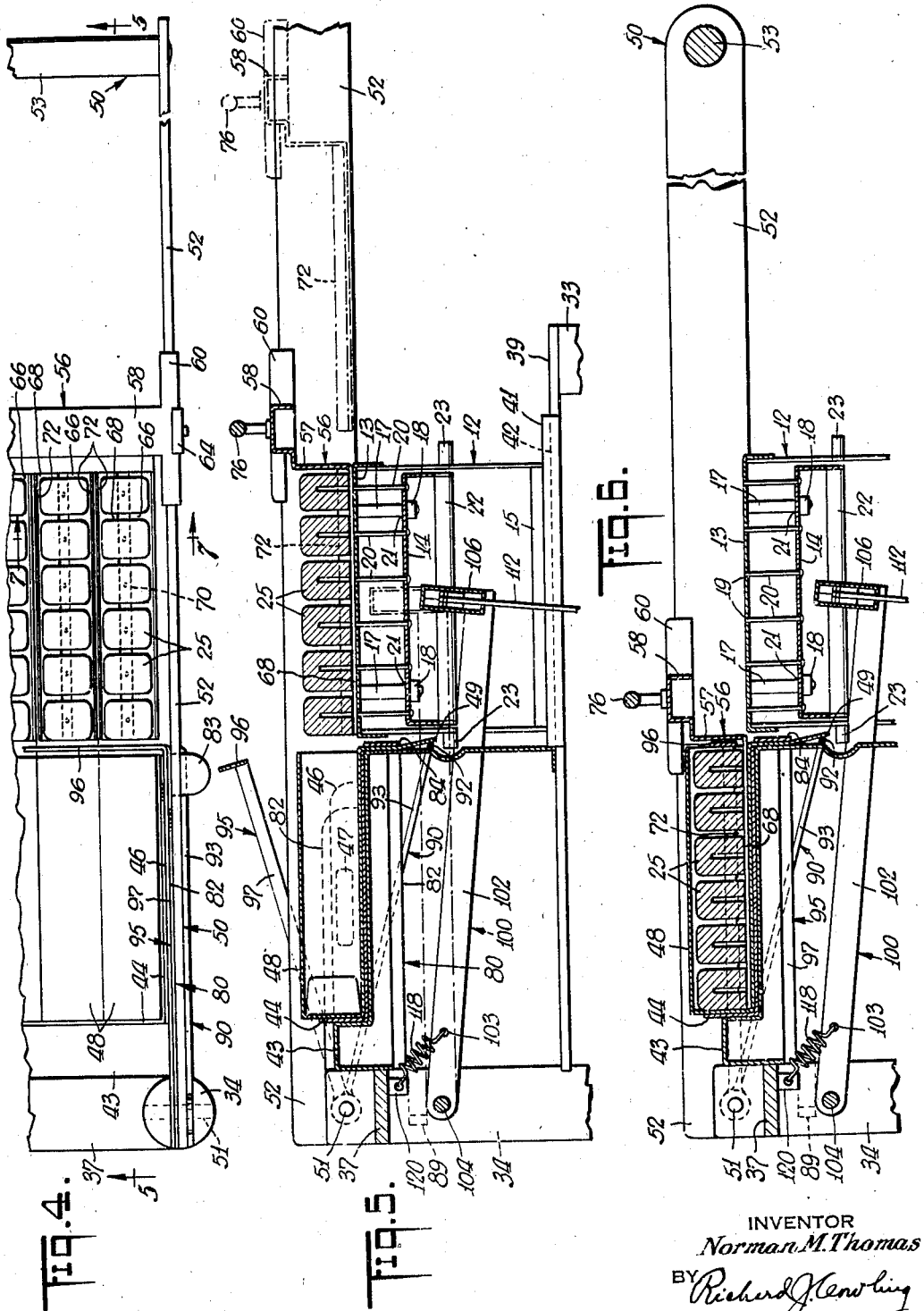

Patented Feb. 24, 1942

2,274,465

UNITED STATES PATENT OFFICE 2,274,465

APPARATUS FOR MANUFACTURING CONFECTIONERY PRODUCTS

Norman M. Thomas, Medford Lakes, N. J., assignor to Joe Lowe Corporation, New York, N. Y., a corporation of Delaware Application July 10, 1941, Serial No. 401,722

10 Claims. (Cl. 107—45)

The present invention relates generally to the manufacture of frozen confectionery products of the type simulating the candy "bon bon," and it has relation specifically to a new and improved apparatus for harvesting and packaging a plurality of rows of such confectionery products in a plurality of boxes in an efficient and sanitary manner.

The present application is a continuation in part of my earlier co-pending application Serial No. 367,141, filed November 25, 1940, entitled "Method of and Apparatus for Manufacturing Confectionery Products," and reference is made thereto for a complete understanding of the operation of any common part or parts which are not shown or described in complete detail herein.

Another object of the invention is to provide simple, inexpensive and economical apparatus whereby the method of harvesting and packaging can be efficiently and sanitarily carried out with a minimum number of operating steps.

A further object of the invention is the provision of a novel and efficient movable carriage which is capable of receiving a plurality of spaced rows of confectionery products from their respective spurs of a portable manipulating apparatus while maintaining their respective positions and alignment, and deliver simultaneously said spaced rows of spaced confectionery products directly within a plurality of aligned dispensing boxes or cartons.

Another object of the invention is to provide a novel, efficient and inexpensive device for retaining said confectionery products in their respective positions within said boxes while the delivery mechanism is being withdrawn therefrom.

Other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Fig. 1 is a perspective view of apparatus constructed in accordance with the invention for packaging simultaneously a plurality of spaced rows of spaced confectionery products;

Fig. 2 is a perspective view of a conventional spur plate apparatus, having a combined stripper plate built therein, and illustrating a plurality of individual confectionery bodies separately bonded to its depending spurs, which device is utilized in manipulating and harvesting the confectionery products during their various manufacturing operations;

Fig. 3 is another perspective view of the packaging platform of the apparatus shown in Fig. 1, and illustrating the step of actually moving the rows of confectionery products from the spur plate to their respectively aligned and juxtaposed boxes;

Fig. 4 is a fragmentary plan view on an enlarged scale of that portion of the apparatus shown in Fig. 3, illustrating the manner of positioning the portable spur plate on the apparatus for removing the confectionery products from its respective spurs;

Fig. 5 is an enlarged fragmentary sectional view of the mechanism employed in releasing the confectionery products from their respective spurs, the same having been taken substantially along the line 5—5 of Fig. 4, looking in the direction of the arrows, and illustrating the step of removing said spurs;

Fig. 6 is another enlarged fragmentary sectional view similar to Fig. 5, but showing the finished confectionery products after the spurs have been removed and illustrating the step of moving them into their respective packaging boxes; and Fig. 7 is a fragmentary sectional view of the movable carriage of the apparatus shown in Fig. 4, the same having been taken substantially along the line 7—7 thereof, looking in the direction of the arrows.

Referring now to the drawings, wherein like numerals indicate like parts, there is shown in Fig. 2 a conventional portable spur plate or carrier 12, comprising a pair of superimposed slidably mounted marginal plates 13 and 14. The lower plate 13 having a plurality of transversely extending handles 15 fixedly secured thereto in any suitable manner as by spot-welding, riveting, etc., as indicated at 16. A pair of oppositely disposed upstanding arms 17, having enlarged heads 18, are mounted adjacent each end of the lower plate 13, which serve as stops for limiting the distance of separation between the plates 13 and 14. The lower plate 13 has a plurality of spaced apertures 19 arranged in rows transversely and longitudinally. The upper plate 14 is provided with a plurality of depending spurs 20, which are similarly spaced to correspond with the apertures 19 of the lower plate 13, and are adapted to extend therethrough when said plates are superimposed. Apertures 21 are also provided in the upper plate 14 for permitting the arms 17 to pass therethrough. The upper plate 14 is likewise provided with a pair of transversely extending handles 22. It will be noted that the handles 15 and 22 of the plates 13 and 14, respectively, are positioned adjacent each other so that both may be grasped by one hand for manual operation if desired. Suspending stops in the form of studs 23 are provided intermediate the uprights of the handles 15 for suspending the carrier 12 over the upstanding sidewalls of a conventional mold structure (not shown). In the illustration shown, it will be noted that a frozen confectionery product 25 is bonded to the lower end of each spur 20. These confectionery products 25 are now ready for removal from their respective spurs and for packaging or boxing.

Referring now to Fig. 1 of the drawings, there is shown a harvesting and packaging apparatus 30 embodying my invention. The apparatus 30 consists of a plurality of front supporting legs 33, and a plurality of rear supporting legs 34, the latter extending upwards a short distance beyond the tops of the front legs 33. The front legs 33 are suitably braced transversely by cross-rods 36, and the rear legs 34 are similarly braced by cross-rods 37. The front legs 33 and rear legs 34 are suitably connected by lower cross-rods 38 and upper cross-bars 39. Tracks 41 are mounted on top of the cross-bars 39 adjacent the front end thereof, having a channel 42 for receiving and supporting the handles 15 of the spur plate 12. Mounted transversely of the back of the apparatus 30 is an elevated depressed platform 43, which is adapted to act as a supporting means for receiving a removable box holding tray 44, having upstanding side flanges 46, the latter having slots 47 therein to provide hand holes for facilitating gripping. The tray 44, in the illustration shown, is of a size adapted to receive a series of twelve open-ended conventional boxes 48, having end closure flaps 49, said boxes being aligned in a side by side horizontal arrangement, being one box for each transverse row of spurs 20 on the portable carrier 12.

A frame structure 50 is suitably mounted pivotally on a shaft 51 fastened transversely of a slot 52 cut into the tops of the back legs 34. The frame structure 50, having side arms 52 connected at their front ends by a cross-rod 53, has mounted intermediate its ends a slidable tray or supporting platform 56 for receiving the confectionery products 25 from the carrier 12. The tray member 56 consists of a channel-shaped cross-bar 58, having side runners 60 provided on their undersides with channels 62 adapted to receive the top surface of the side arms 52. A clamping member 64 secures the runners 60 to the guide rails or side arms 52. The tray member 56 has an integral vertical portion forming a cross-bar 57 that connects with the bottom portion thereof, which consists of a plurality of transversely spaced pairs of flat longitudinally extending supporting bars 66 and 68 that are formed integrally with the cross-bar 57 but extend outwardly therefrom in the same horizontal plane as the inside of the bottom of the receiving boxes 48 when positioned in the tray 44. It will be noted that the supporting bars 66 and 68 are separated transversely of the slidable member 56 by a longitudinal slot 70, which permits passage of the spurs 20 of each row of spurs on the portable carrier 12. The outer edges of each of the bars 66 and 68 is turned upwardly, as indicated at 72, to provide integral flanges for keeping the confectionery products 25 properly aligned in longitudinally extending rows after their release from their respective spurs 20 of the carrier 12, as will be hereinafter more fully explained. Stops 74 are provided adjacent the outer ends of the guide rails 52 for limiting the forward movement of the slidable tray member 56 on its guide rails 52. A manipulating handle 76 is mounted centrally of the top of the cross-bar 58 to facilitate operation manually of the slidable tray member 56.

A second pivotal frame member 80 is mounted on the shaft 51 of the rear uprights 34 to provide means for holding down the open-end flaps 49 of the boxes 48. The frame member 80 has a pair of side arms 82 provided with outwardly extending ears 83, forming suitable finger tabs for manipulating the same, and a transversely extending cross-bar 84 which serves to engage and hold down the end flaps 49 of the boxes 48 during the filling operation. The side arms 82 are provided with projections 86 adapted to engage frictionally an indentation 88 on the side arms 52 of the frame structure 50. In this manner the frame structure 50 and the frame structure 80 may be locked together and moved as a single unit, or separately, as desired. A lug 89 is formed adjacent the rear of each of the side arms 82 for providing means for engaging an associated pivotal frame member 90 hereinafter to be described.

A third associated pivotal frame structure 90, consisting of a transversely extending cross-bar 92 connected by side arms 93, is pivotally mounted on the shaft 51 of the rear supporting legs 34. The bar 92 is adapted to be positioned below the forward ends of the boxes 48 and behind their downwardly projecting open-end flaps 49. It will be apparent that when the frame member 80 is raised upwardly, removing its cross-bar 84 from the end flaps 49 of the boxes 48, thereby releasing the same, the lugs 89 engage the side arms 93 of the frame member 90 and carries it upwardly, causing its cross-bar 92 to force upwardly the depending end flaps 49 to a position whereby they may be easily and quickly slipped manually into their respective boxes 48 to close the same.

A fourth pivotal frame structure 95, consisting of a transversely extending cross-bar 96 connected by side arms 97 is pivotally mounted on the shaft 51 of the rear supporting legs 34. The side arms 97 are adapted to pass between the side arms 82 of the frame structure 80 and the sides 46 of the tray member 44 when the same is pivotally operated from the position shown in Fig. 1 to the position shown in Fig. 6. The cross-bar 96 thus serves to block the open-ends of the boxes 48 to prevent the frozen confectionery products 25 from being withdrawn therefrom when the supporting bar members 66 and 68 of the tray member 56 are being withdrawn therefrom. In other words, the cross-bar 96 serves to strip the confectionery products 25 from the supporting tray 56 when the same is being wtihdrawn from said boxes 48.

Stripping means 100 is provided for automatically removing the spurs 20 from their respective confectionery products 25. This means consists of a pair of forwardly projecting horizontal arms 102 pivotally mounted on a shaft 104 secured in the rear supporting legs 34. A housing 106 is mounted transversely of the arms 102 adjacent the forward ends thereof, and adapted to act as a guide track for a pair of spaced transversely slidable arms 108, which are pivotally connected to a common lever 112. A projecting finger 116 is provided adjacent the top and outside end of each arm 108, which fingers 116 are adapted to engage the handles 22 of the spur plate 12, as best shown in Fig. 5. Spring tensioning means 118 connects the arms 102 from a point 103 spaced from the legs 34 to a fastening lug 120, and provides means for maintaining normally the stripping means 100 in its uppermost position. The lever 112 is connected, as indicated at 122, to a link 124, which in turn is connected as at 126, to a foot treadle operated lever 128, fulcrumed at its rear end to the floor by means of a bifurcated plate member 130. The forward end of the lever 128 is provided with a foot pad 132.

In operation of the stripping means 100, it will be apparent that when pressure is applied downwardly on the foot pad 132 by the foot of the operator, the lever 128 pulls its connecting link 124 downwardly, causing the projecting fingers 116 to be moved beyond the handles 22 of the spur plate 12. Further downward movement of the lever 112 pulls the housing 106 and its pivotal supporting arms 102 downwardly against the spring tensioning means 118. This further downward movement causes the fingers 116 to exert pressure downwardly on the handles 22, withdrawing the spurs 29 downwardly through the stripping plate 13. As the spurs 20 are withdrawn through slots 70, the flat upper surfaces of the bars 66 and 68 exerts pressure against the bottom side of the confectionery products 25, forcing them from their respective spurs, and when they are entirely free of the spurs 20 the confectionery products 25 will be resting on the bars 66 and 68 between their side flanges 70, in which position they are ready for delivery into their respectively aligned boxes 48.

In harvesting and packaging the completed frozen confectionery products 25, it is assumed that the tray 44 has been loaded with boxes 48 and positioned in the depression of the elevated platform 43, with the open-ended flaps 49 secured under the cross-bar 84 of the frame structure 80, and that the cross-rod 92 is properly positioned under the flaps 49, as best shown in Fig. 1. It is also to be assumed that the frame structures 50 and 80 are in their respective horizontal positions with the slidable member 56 resting on the forward ends of the guide rails 52 against the stops 74, and that the frame structure 95 is positioned upwardly, as in Fig. 1, out of the way.

The portable spur plate 12, which is best shown in Fig. 2, is inverted with the handles 15 mounted in the channels 64 of the arms 52, as best shown in Fig. 5, with the confectionery products 25 uppermost. The slidable tray member 56 is now moved backwardly of the machine on its guide rails 52 until the rows of spurs 20 are positioned in the slots 70 and each pair of the flat supporting bars 66 and 68 extend directly under each row of confectionery products 25 of the carrier 12, the vertical cross-bar 57 being then positioned immediately behind the last confectionery product 25 of each row. Releasing of the confectionery products 25 from their respective spurs 20 may be accomplished by depressing the foot pad 132, which as heretofore described, moves the fingers 116 over the handles 22 of the spur plate 12, withdrawing the spurs 20 through the slots 70 between each pair of supporting bars 66 and 68, forcing the confectionery products 25 therefrom and depositing them on said supporting bars 66 and 68. Withdrawal of the spurs 20 from the confectionery products 25 leaves a small aperture 135 extending into the product, as best shown in Figs. 5 and 6. Thereupon, the slidable frame member 56 is moved farther towards the rear of the machine until the front ends of the supporting bars 66 and 68 engage the inside rear end wall of the open boxes 48, carrying each row of confectionery products 25, which were previously deposited thereon, into their respective dispensing cartons 48. The fourth pivotal frame structure 95 is now ready to be moved to its horizontal operating position, as best shown in Fig. 6, in which position the cross-bar 96 closes the open ends of the boxes 48 and rests upon the supporting bars 66 and 68 of the slidable member 56. The slidable frame member 56 is now ready to be moved towards the front of the machine, withdrawing the bar members 66 and 68 from the boxes 48, but the cross-bar 96 prevents the confectionery products from being likewise withdrawn, stripping them from the supporting bars 66 and 68 and depositing them in said boxes. The frame member 95 may now be moved out of the way or back to its vertical position.

The foot treadle 132 may now be released and the frame members 50 and 56 moved as a unit to their vertical positions shown in Fig. 1. This releases the end flaps 49 of the boxes 48. When the member 80 approaches the end of its movement vertically, the lugs 89 engage the arms 93 of the associated frame member 90, moving its front cross-bar 92 upwardly. This upward movement of the cross-bar 92 brings the end flaps 49 of the boxes 48 into a position for easy manual closing. The tray 44 may now be removed from its depressed centering platform 43, and its contents packed in cartons for shipping.

Although I have only described in detail one form which the invention may assume, it will be apparent to those skilled in the art that the invention is not so limited, but that various modifications may be made therein without departing from the spirit thereof or from the scope of the appended claims.

What I claim is:

1. Apparatus for harvesting and packaging a plurality of frozen confectionery products which comprises means for supporting an open box, means for receiving a row of confectionery products in alignment with said box, means for causing relative movement between said box supporting means and said confectionery receiving means whereby the row of confectionery products on said receiving means is moved within said box, and means for stripping the confectionery products from said receiving means for depositing them in said box.

2. Apparatus for harvesting and packaging a plurality of frozen confectionery products which comprises means for supporting a plurality of individual boxes, means for receiving a portable carrier having a plurality of spaced rows of spaced confectionery products mounted thereon, means for receiving the confectionery products from said carrier, means for causing relative movement between said carrier and said receiving means for releasing the confections from said carrier and depositing them on said receiving means, and means for causing relative movement between said confectionery receiving means and said box supporting means for depositing said confectionery products into said boxes.

3. Apparatus for harvesting and packaging a plurality of frozen confectionery products which comprises means for supporting a plurality of individual boxes in alignment in a single plane, means for receiving a portable carrier having a plurality of spaced rows of spaced confectionery products mounted thereon, means for receiving the rows of confectionery products from said carrier in alignment with said boxes whereby one row is aligned with each box, means for causing relative movement between said carrier and said receiving means for releasing the confections from said carrier and depositing them on said receiving means, means for causing relative movement between said confectionery receiving means and said box supporting means for moving said confectionery products into said boxes, and means for stripping said confectionery products from said receiving means for depositing them into said boxes.

4. Apparatus for harvesting and packaging a plurality of frozen confectionery products which comprises means for supporting a plurality of individual open boxes in a single horizontal plane, means for receiving a portable carrier having a plurality of spaced rows of spaced confectionery products mounted thereon, means for receiving the rows of confectionery products from said carrier with each row being aligned with a box, means for causing relative movement between said carrier and said receiving means for releasing the confections from said carrier and depositing them in rows on said receiving means, and means for moving said supporting member and its rows of confectionery products into said open boxes whereby said confectionery products are deposited in said boxes.

5. Apparatus for harvesting and packaging a plurality of frozen confectionery products which comprises means for supporting a plurality of individual open boxes in a single horizontal plane, means for receiving a portable carrier having a plurality of spaced rows of spaced confectionery products mounted thereon, horizontal means for receiving the rows of confectionery products from said carrier with each row being aligned with a box, means for causing relative movement between said carrier and said receiving means for releasing the confections from said carrier and depositing them in rows on said receiving means, and means for slidably moving said supporting member and its rows of confectionery products into said open boxes whereby said confectionery products are deposited in said boxes.

6. Apparatus for harvesting and packaging a plurality of frozen confectionery products which comprises means for supporting a plurality of individual open boxes in a single horizontal plane, means for receiving a portable carrier having a plurality of spaced rows of spaced confectionery products mounted thereon, means for receiving the rows of confectionery products from said carrier with each row being aligned with a box, means for causing relative movement between said carrier and said receiving means for releasing the confections from said carrier and depositing them in rows on said receiving means, means for moving said supporting member and its rows of confectionery products into said open boxes, and means for removing said confectionery products from said receiving means when the same is withdrawn from said boxes whereby said confectionery products are deposited in said boxes.

7. Apparatus for harvesting and packaging a plurality of frozen confectionery products which comprises means for supporting a plurality of individual open boxes in alignment, means for receiving a portable carrier including a plurality of spaced rows of spaced projecting spurs having confectionery products bonded thereto, a slotted tray member adapted to be inserted between said confectionery products and said carrier, means for withdrawing the spurs from said confectionery products and said tray member for depositing the confectionery products on said tray member, and means for moving said tray member into said open boxes for depositing said confectionery products therein.

8. Apparatus for harvesting and packaging a plurality of frozen confectionery products which comprises means for supporting a plurality of individual open boxes in alignment, means for receiving a portable carrier including a plurality of spaced rows of spaced projecting spurs having confectionery products bonded thereto, a slotted tray member adapted to be inserted between said confectionery products and said carrier, means for withdrawing the spurs from said confectionery products and said tray member for depositing the confectionery products on said tray member, means for slidably moving said tray member into said boxes, and means for removing said confectionery products from said tray member as the same is being withdrawn from said boxes to deposit said products therein.

9. Apparatus for harvesting and packaging a plurality of frozen confectionery products which comprises means for supporting a plurality of individual open boxes in alignment, means for receiving a portable carrier including a plurality of spaced rows of spaced projecting spurs having confectionery products bonded thereto, a tray member including a plurality of pairs of spaced bars aligned with said boxes and adapted to be inserted between said confectionery products and said carrier, means for withdrawing the spurs from said confectionery products and tray member for depositing a row of said confectionery products on each pair of bars, and means for moving each pair of bars into its aligned box for delivering its confectionery products therein.

10. Apparatus for harvesting and packaging a plurality of frozen confectionery products which comprises means for supporting a plurality of individual open boxes in alignment, means for receiving a portable carrier including a plurality of spaced rows of spaced projecting spurs having confectionery products bonded thereto, a tray member including a plurality of pairs of spaced bars aligned with said boxes and adapted to be inserted between said confectionery products and said carrier, means for withdrawing the spurs from said confectionery products and tray member for depositing a row of said confectionery products on each pair of bars, means for slidably moving each pair of bars into its aligned box, for delivering its confectionery products therein, and means for stripping said confectionery products from said bars and depositing them in said boxes when the same are being withdrawn therefrom.

NORMAN M. THOMAS.